(12) United States Patent
Kim (10) Patent No.: US 11,402,300 B2
(45) Date of Patent: Aug. 2, 2022

(54) BLADE STRUCTURE TESTING EQUIPMENT AND METHOD FOR TESTING BLADE SPECIMEN BY USING SAME

(71) Applicant: KOREA AEROSPACE RESEARCH INSTITUTE, Daejeon (KR)

(72) Inventor: Tae Joo Kim, Daejeon (KR)

(73) Assignee: Korea Aerospace Research Institute, Daejeon (KR)

(*) Notice: Subject to any disclaimer, the term of this patent is extended or adjusted under 35 U.S.C. 154(b) by 10 days.

(21) Appl. No.: 17/042,296

(22) PCT Filed: Mar. 28, 2019

(86) PCT No.: PCT/KR2019/003651
§ 371 (c)(1),
(2) Date: Sep. 28, 2020

(87) PCT Pub. No.: WO2019/203469
PCT Pub. Date: Oct. 24, 2019

(65) Prior Publication Data
US 2021/0025786 A1    Jan. 28, 2021

(30) Foreign Application Priority Data

Apr. 17, 2018  (KR) .......................... 10-2018-0044620

(51) Int. Cl.
*G01M 99/00*    (2011.01)
(52) U.S. Cl.
CPC .................................. *G01M 99/00* (2013.01)
(58) Field of Classification Search
CPC ..................................................... G01M 99/00
See application file for complete search history.

(56) References Cited

U.S. PATENT DOCUMENTS

| 5,425,276 A * | 6/1995 | Gram ....................... G01N 3/32 |
| | | 73/781 |
| 2005/0216240 A1* | 9/2005 | Shiga ....................... F16H 7/02 |
| | | 703/2 |

(Continued)

FOREIGN PATENT DOCUMENTS

| KR | 10-2013-0087920 A | 8/2013 |
| KR | 20130087920 A * | 8/2013 |

(Continued)

OTHER PUBLICATIONS

Hwan, Test equipment and test methods of wind power generator blade, 2013, Espacenet English Translation (Year: 2013).*

(Continued)

*Primary Examiner* — Alexander Satanovsky
*Assistant Examiner* — Lyudmila Zaykova-Feldman
(74) *Attorney, Agent, or Firm* — Rabin & Berdo, P.C.

(57) ABSTRACT

The present invention provides blade structure testing equipment comprising: a mounting jig to which one end of a blade specimen is mounted; a grip member to which the other end of the blade specimen is coupled; and a wire (W) having one end attached to the grip member to apply a tensile force to the blade specimen in a direction at a certain angle with respect to the ground. Also, the present invention provides a method for testing a blade specimen, the method comprising: a first step of coupling one end of the blade specimen to a mounting jig and the other end of the blade specimen to a grip member; a second step of determining the values of a centrifugal force, a flap moment, and a lag moment that are to be applied to the blade specimen; a third step of determining the magnitude and direction of a tensile force to be applied to the blade specimen, on the basis of the values determined in the second step; and a fourth step of attaching one end of a wire to the grip member and applying a tensile force to the blade specimen by means of the wire at the (Continued)

magnitude and in the direction of the tensile force determined in the third step.

15 Claims, 5 Drawing Sheets

(56) References Cited

U.S. PATENT DOCUMENTS

| | | | |
|---|---|---|---|
| 2010/0175480 A1 | 7/2010 | Guy | |
| 2010/0275695 A1* | 11/2010 | Cotrell | G01M 7/06 |
| | | | 73/663 |
| 2011/0229322 A1* | 9/2011 | Tadayon | F03D 1/065 |
| | | | 416/91 |
| 2012/0020798 A1* | 1/2012 | Barnsley | F03D 1/0633 |
| | | | 416/223 R |
| 2016/0177920 A1* | 6/2016 | Donazar Moriones | |
| | | | F03D 1/0675 |
| | | | 416/230 |
| 2019/0094104 A1* | 3/2019 | Penn | G01M 5/0075 |
| 2020/0011760 A1* | 1/2020 | Richards | F03D 17/00 |

FOREIGN PATENT DOCUMENTS

| | | | | |
|---|---|---|---|---|
| KR | 20130087920 A | * | 8/2013 | |
| KR | 10-2014-0056667 A | | 5/2014 | |
| KR | 20140056667 A | * | 5/2014 | |
| KR | 20140056667 A | * | 5/2014 | |
| KR | 10-2016-0027529 A | | 3/2016 | |

OTHER PUBLICATIONS

Chang, Device for applying static dual-axis loads to blade, 2014, Espacenet English Translation (Year: 2014).*

Hwan, Test equipment and test methods of wind power generator blade, KR-20130087920-A, 2013, Espacenet English Translation (Year: 2013).*

Chang, Device for applying static dual-axis loads to blade, KR-20140056667-A, 2014, Espacenet English Translation (Year: 2014).*

* cited by examiner

BLADE STRUCTURE TESTING EQUIPMENT AND METHOD FOR TESTING BLADE SPECIMEN BY USING SAME

TECHNICAL FIELD

The present invention relates to structure testing equipment for a rotating body lift generating component such as a helicopter blade or propeller that generates lift through rotational motion, and more specifically, to structure testing equipment for providing a structure capable of applying a force and a moment approximating the load/boundary conditions in actual operation of the blade.

BACKGROUND ART

Figure 1:
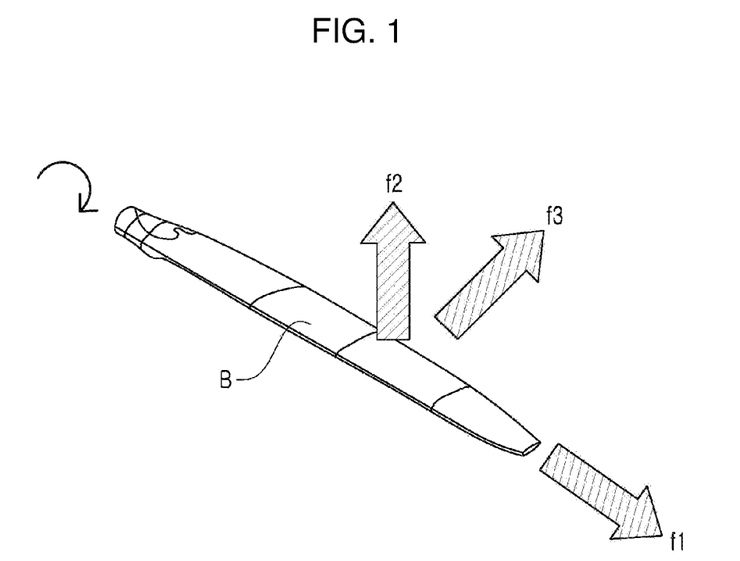
FIGS. 1 and 2 illustrate the force and moment acting on a blade of a rotating body such as a helicopter.
Figure 2:
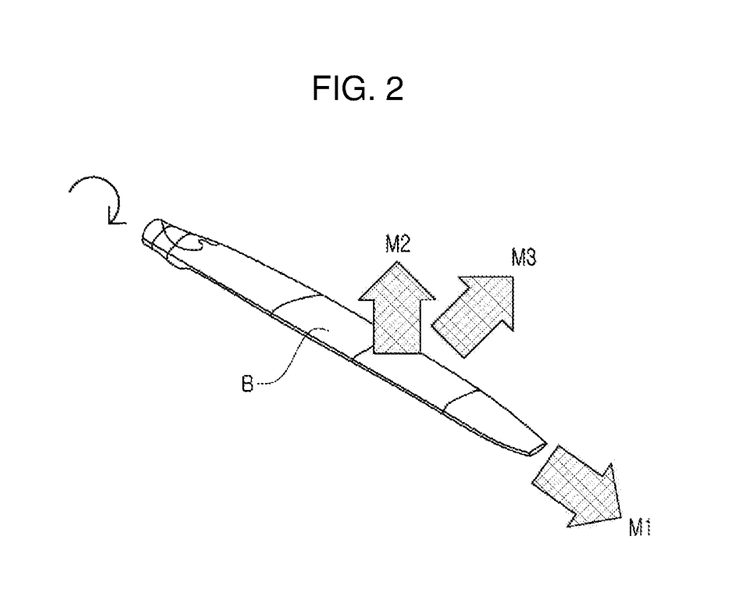

When designing and developing dynamic components of a rotorcraft such as a helicopter, it is necessary to ensure that there are no problems with structural safety, and for this purpose, these are confirmed through structural analysis or testing. In the case of the rotorcraft, three forces of centrifugal force, lift force, and drag force (f1, f2, f3 in FIG. 1) act on the blade while the blade is rotated at high speed to generate lift, and there are three moments also generated by these forces, which are, flap moment, lead-lag moment and a warp moment (M1, M2, M3 in FIG. 2). Among these, the tensile stresses and bending loads such as centrifugal force, lead-lag moments and flap moments have the greatest structural impact. Therefore, it is necessary to conduct a test to verify the structural safety of the blade in the developing stage of the propeller or blade, in consideration of these forces and moments.

Figure 3:
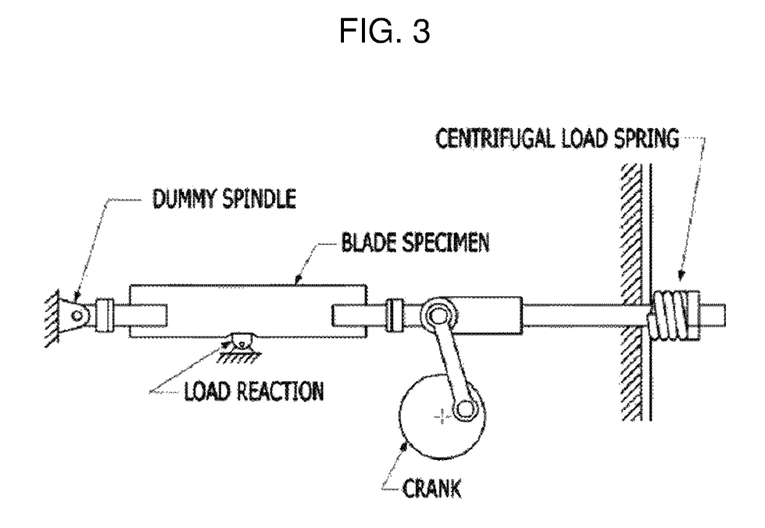
FIG. 3 shows a related blade structure testing equipment.
Figure 4:
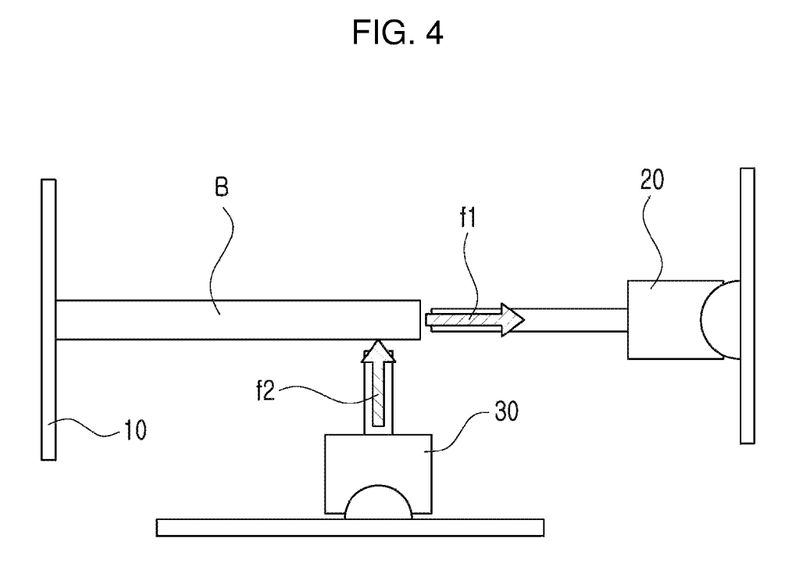
FIG. 4 shows boundary conditions in the related blade structure testing equipment.

The related art for testing the blade structure performance is disclosed in Korean Patent Publication No. 10-2016-0027529 whose representative view is shown in FIG. 3. Most of these related blade structure testing equipment share the conceptual form as shown in FIG. 4.

A related blade structure testing method is briefly described below with reference to FIG. 4.

One end of the blade test specimen (hereinafter referred to as a "blade") is fixed to a body 10 of a jig for structural testing, and the other end of the blade B is mounted with hydraulic actuators 20 and 30 for applying a load. In order to transfer the load generated by the hydraulic actuators to the test specimen, the hydraulic actuators and the specimen are connected to each other with an adapter. The loads (centrifugal force and lift force) are generated from the hydraulic actuators and applied to the test specimen and the presence or absence of damages in the specimen is checked.

Figure 5:
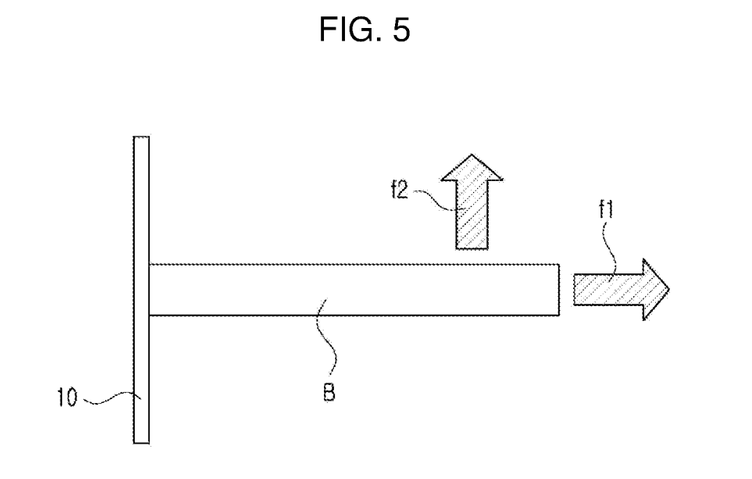
FIG. 5 is a diagram showing the boundary conditions of the blade in actual operation.

However, the related testing method has shortcomings as described below with reference to the comparison of FIGS. 4 and 5. FIG. 5 is a diagram conceptually showing the force acting in the actual operating environment of the blade.

Referring to FIG. 5, the only load that acts on the blade in the actual blade operating environment are the air force and the centrifugal force (there are only the fixed boundary conditions at the blade), and there is no rotation boundary condition in contact to transfer the force to the blade. Meanwhile, additional rotational boundary conditions are added for the related testing method shown in FIG. 4 that uses the hydraulic actuator.

For this reason, the related testing method has a problem that it is not possible to predict the moment that occurs when the actual load is applied, and in order to handle this, it is necessary to establish a moment monitoring environment using a sensor such as a strain gauge, and the like and check whether the desired moment is applied during testing.

Further, the related testing method has the inconvenience that it is required to perform complicated processes in order to use the hydraulic actuator, including calibrating the load cell, constructing a Wheatstone bridge in the blade specimen and calibrating the same to calculate the applied moment, and the like.

DISCLOSURE

Technical Problem

The present invention has been made to overcome the problems mentioned above, and an object of the present invention is to provide a method capable of easily applying a desired centrifugal force and moment to a blade component, and another object is to provide a method capable of applying the boundary conditions same as those in the actual blade operation without requiring additional sensor calibrations, thus simplifying the test process and also increasing the reliability of results.

Technical Solution

The present invention provides blade structure testing equipment including: a mounting jig to which one end of a blade specimen is mounted; a grip member to which the other end of the blade specimen is coupled; and a wire having one end attached to the grip member to apply a tensile force to the blade specimen in a direction at a certain angle with respect to the ground.

A mass is connected to the other end of the wire so that the tensile force is applied to the blade specimen under the load of the mass.

The mounting jig further includes: a support 110; and an adapter 125 which is coupled to an upper end of the support and to which the one end of the blade specimen is mounted, and the mounting jig further includes a rotating member 120 positioned between the support and the adapter and capable of rotating the adapter about a longitudinal direction of the blade specimen as an axis direction.

Rotating the rotating member at a certain angle results in a flap moment and a lag moment being applied to the blade specimen by the wire tensile force.

A pulley 180 is further provided to change a load direction of the wire, and the pulley is located at a higher position than the blade specimen and is disposed to be movable in a vertical direction.

In addition, the present invention provides a blade specimen testing method including: a first step of coupling one end of the blade specimen to a mounting jig and the other end of the blade specimen to a grip member; a second step of determining the values of a centrifugal force, a flap moment, and a lag moment that are to be applied to the blade specimen; a third step of determining the magnitude and direction of a tensile force to be applied to the blade specimen, on the basis of the values determined in the second step; and a fourth step of attaching one end of a wire to the grip member and applying a tensile force to the blade specimen by means of the wire at the magnitude and in the direction of the tensile force determined in the third step.

In the fourth step, a mass corresponding to the magnitude of the tensile force determined in the third step is connected to the other end of the wire to apply the tensile force to the blade specimen, the direction of a wire tensile force may be adjusted such that the wire is arranged in the direction of the tensile force determined in the third step, and the arranging the wire includes arranging the wire in the direction of the tensile force by adjusting a vertical position of a pulley while holding the wire supported by the pulley.

In the fourth step, a step of rotating the blade specimen about a longitudinal direction thereof as an axis direction may be further included.

Effects of the Invention

The present invention has an advantageous effect that it is possible to provide a testing environment where the boundary conditions same as those in the actual operation of the blade are provided by the use of a mass only, and it is also possible to apply the centrifugal force, the lead-lag moment and flap moment mainly acting on the blade without causing changes in the boundary conditions.

BEST MODE

The objects, specific advantages and novel features of the present invention will be more apparent from the following detailed description and preferred embodiments associated with the accompanying drawings. In addition, the terms used herein are those defined in consideration of functions in the present invention, which may vary according to the intent or practice of the user/operator. Therefore, the definitions of these terms should be made based on the contents throughout the description.

Figure 6:
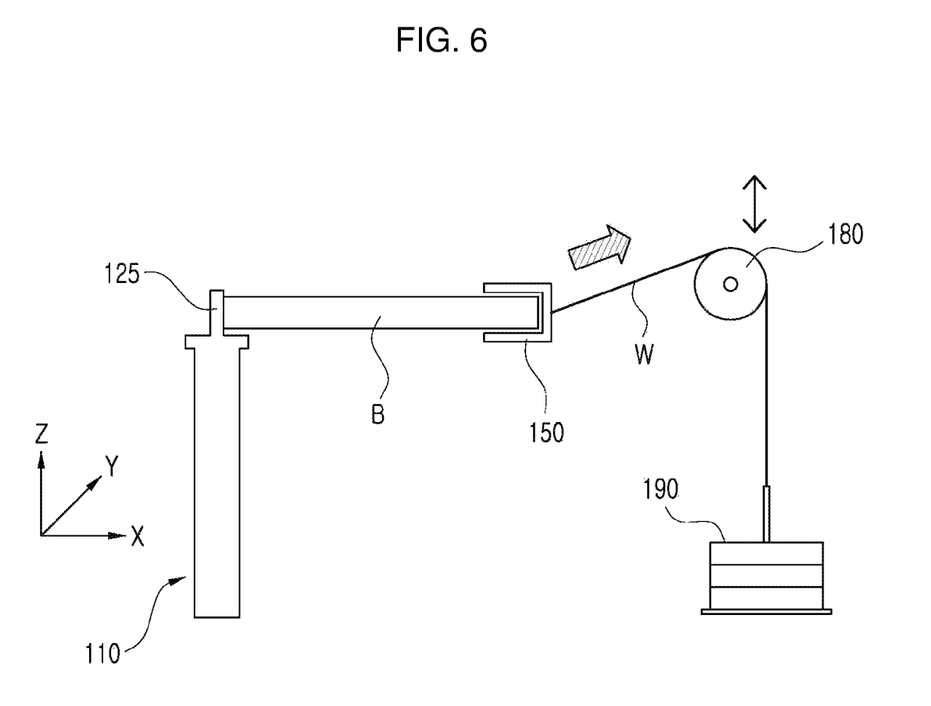
FIG. 6 shows a blade structure testing equipment according to an embodiment of the present invention.
Figure 7:
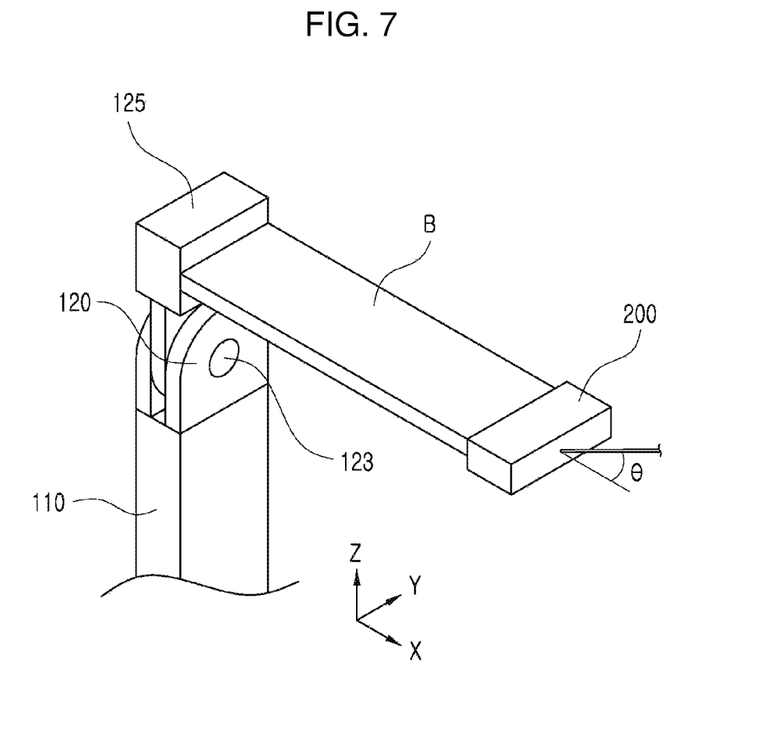
FIG. 7 shows part of the blade structure testing equipment illustrated in FIG. 6.

FIGS. 6 and 7 show a blade structure testing equipment according to an embodiment of the present invention.

The blade structure testing equipment according to the present invention includes, first, a mounting jig to which one end of a blade specimen (or, 'blade', B) is fixedly mounted, and a grip member 150 to which the other end of the blade specimen is coupled. The mounting jig 110, 125 includes a support 110 in columnar shape disposed vertically on the ground, and an adapter 125 at the top of the support, for directly coupling a blade specimen. The adapter 125 is configured in such a way that it can be replaced in consideration of the size and shape of the blade and mounted to the support.

The mounting jig of the present invention may further include a rotating member 120 positioned between the support 110 and the adapter 125, in which the rotating member 120 is provided with a rotating shaft 123 so as to rotate the adapter about a longitudinal direction of the blade specimen (X direction in FIG. 7) which is the axis of rotation.

As shown in FIGS. 6 and 7, for convenience of description of the present invention, the longitudinal direction of the blade specimen is referred to as the X direction, the direction of the support 110 is referred to as the Z direction, and the direction perpendicular to the X and Z directions is referred to as the Y direction. Since the adapter is rotatable by the rotating member 120 about the X direction as a reference axis, the blade specimen B may be rotated with one end thereof being fixed to the mounting jig. In the description of the present invention, by "blade axial rotation", it means the rotation of the blade specimen in this direction. The reason for rotating the blade in the X-axis direction is to simultaneously apply the lead-lag moment together with the flap moment to the specimen (this will be described below).

The blade structure testing equipment of the present invention further includes a grip member 150 for holding the other end of the blade specimen B, and a wire W attached with one end to the grip member to apply a tensile force to thus apply a force to the blade specimen. The wire applies a force to the blade specimen, and preferably, applies the force to the blade specimen while being inclined upward by a certain angle ($\theta$ in FIG. 7) with respect to the horizontal direction. To this end, a pulley 180 for supporting the wire W is provided above the blade specimen. The pulley may be mounted so as to be movable in a vertical direction to adjust the inclination angle applied to the blade specimen. In addition, a mass 190 is connected to the other end of the wire to apply, with the load of the mass, a tensile force to the blade specimen. Although it is illustrated in the drawings that the tensile force is applied to the other end of the wire by the use of the masses, the masses may not be necessarily used, and any other means may instead be used as long as it is capable of applying the tensile force. That is, in the illustration of FIG. 6, the pulley and the masses may be removed, and another means capable of applying a tensile force may be instead used to exert the force on the wire in the direction inclined at a certain angle.

Figure 8:
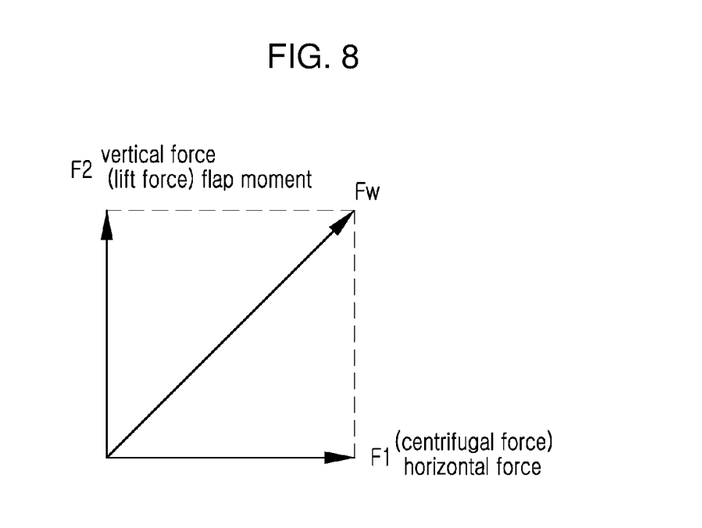
FIG. 8 shows component force of the tensile force acting by a wire in the blade structure testing equipment according to an embodiment of the present invention.

FIG. 8 shows component force of the tensile force acting by a wire in the blade structure testing equipment according to an embodiment of the present invention, showing a state when the 'blade axial rotation' described above is not occurred yet.

When the tensile force is applied at a certain angle to the blade specimen in the upward direction by the wire, the wire tensile force Fw may be divided into a horizontal force in the X-axis direction (F1, corresponding to centrifugal force) and a vertical force in the Z direction (F2, corresponding to lift force). Here, the angle formed by the wire tensile force Fw and the horizontal force F1 is $\theta$. In addition, a flap moment is generated by the horizontal force F1.

As described above, when the centrifugal force and the flap moment to be applied to the specimen are determined (lead-lag moment is not present), the magnitude and direction of the combined force of the tensile force to be applied to the wire may be determined. That is, the horizontal force F1 may be determined by the centrifugal force, and the vertical force F2 may be determined by the flap moment. In addition, the magnitude and direction of the wire tensile force Fw are determined by the combined force of the horizontal force and the vertical force. Utilizing the above principle, it is possible to apply the tensile force to the wire for the testing of the specimen.

Figure 9:
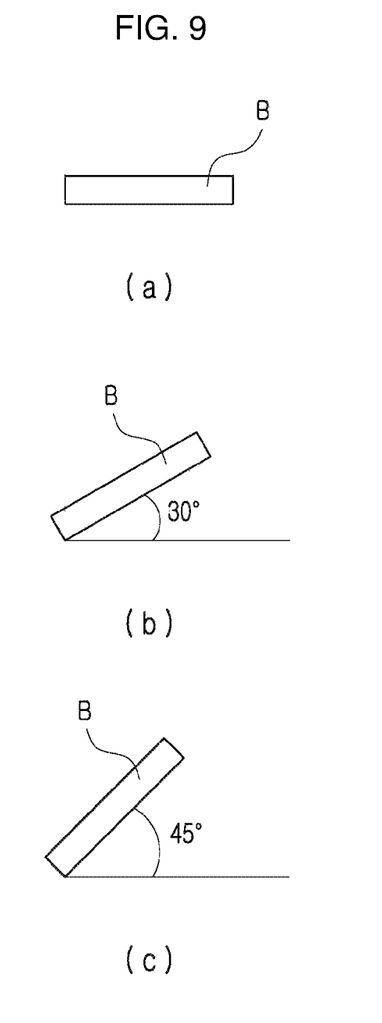
FIG. 9 shows, in cross-section, a blade mounted to the blade structure testing equipment according to an embodiment of the present invention rotating about a longitudinal direction.

FIG. 9 shows, in cross section, a blade mounted to a blade structure testing equipment according to an embodiment of the present invention being rotated about a longitudinal direction (blade axial rotation). The cross-sectional views shown in FIG. 9 are the views of the blade specimen seen from the left, that is, these are cross sectional views perpendicular to the X axis. The angles of 30 and 45 degrees shown in FIGS. 9B and 9C refer to exemplary rotation angles of the blade axial rotation. That is, the test involves rotating the rotating member 120 of the testing apparatus to cause the blade axial rotation to occur, while exerting a tensile force. In this case, not only the centrifugal force and the flap moment but also the lead-lag moment may be applied to the blade specimen.

That is, since the vertical force F2, which is the component force of the wire tensile force Fw in the vertical direction, acts on the upper surface of the blade at an inclination corresponding to the "blade axial rotation", the vertical force F2 may be divided into a first component force F3 generating a flap moment and a second component force F4 generating a lead-lag moment.

Therefore, when the centrifugal force and the flap moment to be applied to the blade specimen are determined, the component forces in the X, Y, and Z directions necessary for the same are determined, respectively. Since the testing equipment has the cantilever boundary condition, the magnitude of the moment is determined by only two factors: force and moment arm. In addition, one combined force may be obtained by calculating the vector sums of the determined component forces in the X, Y, and Z directions, and since this combined force is the tensile force Fw to be applied to the wire, the direction of the wire and the magnitude of the tensile force are determined. Then, the up and down movement of the pulley and a mass of an appropriate weight may be selected to apply the determined tensile force to the wire.

In the present invention, since the centrifugal force, the flap moment and the lead-lag moment are all loads that are calculated by a physical method, there is no need to further verify the load applied to the blade. That is, while the related art requires the use of the Wheatstone bridge to check the moment and also the correction process, the present invention provides an advantage that such are unnecessary.

Hereinafter, a method of testing using the blade specimen testing equipment according to the present invention will be described.

First, the blade specimen testing is performed through a first step of coupling one end of the blade specimen to a mounting jig and the other end of the blade specimen to a grip member; a second step of determining the values of a centrifugal force, a flap moment, and a lag moment that are to be applied to the blade specimen; a third step of determining the magnitude and direction of a tensile force to be applied to the blade specimen, on the basis of the values determined in the second step; and a fourth step of attaching one end of a wire to the grip member and applying a tensile force to the blade specimen by means of the wire at the magnitude and in the direction of the tensile force determined in the third step.

In the fourth step, a mass corresponding to the magnitude of the tensile force determined in the third step may be connected to the other end of the wire to apply the tensile force to the blade specimen, or other methods may be used to pull the wire. In addition, the direction of the tensile force of the wire may be adjusted so that the wire is arranged in the direction of the tensile force determined in the third step. For example, the wire may be arranged in the direction of the tensile force by adjusting the vertical positions of the pulley, while holding the wire supported by the pulley.

The present invention is in consideration of the principle of applying a force to the blade through the wire by use of a plurality of masses, by considering the fact that gravity acts without direct contact, and provides the advantages that the centrifugal force, lead-lag moment and flap moment, which are the three main loads among the six component forces (centrifugal force, lift force, drag force, flap moment, lead-lag moment, and twisting moment) acting on the blade, are applied by utilizing the masses, without causing changes in the boundary conditions compared to the actual blade operating environment.

What is claimed is:

1. Blade structure testing equipment comprising:
   a mounting jig to which one end of a blade specimen is mounted;
   a grip member to which the other end of the blade specimen is coupled; and
   a wire having one end attached to the grip member to apply a tensile force to the blade specimen in a load direction that is at a first angle with respect to the ground.

2. The blade structure testing equipment according to claim 1, wherein a mass is connected to the other end of the wire so that the tensile force is applied to the blade specimen under the load of the mass.

3. The blade structure testing equipment according to claim 1, wherein the mounting jig includes:
   a support; and
   an adapter which is coupled to an upper end of the support and to which the one end of the blade specimen is mounted.

4. The blade structure testing equipment according to claim 3, wherein the mounting jig includes a rotating member positioned between the support and the adapter and capable of rotating the adapter about a longitudinal direction of the blade specimen as an axis direction.

5. The blade structure testing equipment according to claim 4, wherein rotating the rotating member by a second angle results in a flap moment and a lag moment being applied to the blade specimen by the wire tensile force.

6. The blade structure testing equipment according to claim 1, further comprising a pulley provided to change the load direction of the wire, wherein the pulley is located at a higher position than the blade specimen and is provided to be movable in a vertical direction.

7. A blade specimen testing method comprising:
   coupling one end of the blade specimen to a mounting jig and the other end of the blade specimen to a grip member;
   determining the values of a centrifugal force, a flap moment, and a lag moment that are to be applied to the blade specimen;
   determining the magnitude and direction of a tensile force to be applied to the blade specimen, on the basis of the values determined in the determining of the values of the centrifugal force; and
   attaching one end of a wire to the grip member and applying a tensile force to the blade specimen by means of the wire at the magnitude and in the direction of the tensile force determined in the determining of the magnitude and direction of the tensile force.

8. The blade specimen testing method according to claim 7, wherein, in the attaching, a mass corresponding to the magnitude of the tensile force determined in the determining of the magnitude and direction of the tensile force is connected to the other end of the wire to apply the tensile force to the blade specimen.

9. The blade structure testing method according to claim 8, further comprising, in the attaching, adjusting the direction of wire tensile force to arrange the wire in the direction of the tensile force determined in the determining of the magnitude and direction of the tensile force.

10. The blade specimen testing method according to claim 9, wherein the arranging the wire includes arranging the wire in the direction of the tensile force by adjusting a vertical position of a pulley while holding the wire supported by the pulley.

11. The blade specimen testing method according to claim 9, further comprising, in the attaching, rotating the blade specimen about a longitudinal direction thereof as an axis direction.

12. Blade structure testing equipment comprising:
a mounting jig to which one end of a blade specimen is mounted;
a grip member to which the other end of the blade specimen is coupled;
a wire having one end attached to the grip member to apply a tensile force to the blade specimen in a direction that is at a first angle with respect to the ground; and
a pulley provided to change a load direction of the wire, wherein the pulley is located at a higher position than the blade specimen and is provided to be movable in a vertical direction,
wherein a mass is connected to the other end of the wire so that the tensile force is applied to the blade specimen under the load of the mass,
wherein the mounting jig includes:
a support; and
an adapter which is coupled to an upper end of the support and to which the one end of the blade specimen is mounted,
wherein the mounting jig further includes a rotating member positioned between the support and the adapter and capable of rotating the adapter about a longitudinal direction of the blade specimen as an axis direction, and
wherein rotating the rotating member by a second angle results in a flap moment and a lag moment being applied to the blade specimen by the wire tensile force.

13. The blade structure testing equipment according to claim 1, wherein the load direction forms an obtuse angle with a longitudinal direction of the blade specimen.

14. The blade specimen testing method according to claim 7, wherein the direction of the tensile force forms an obtuse angle with a longitudinal direction of the blade specimen.

15. The blade structure testing equipment according to claim 12, wherein the load direction forms an obtuse angle with the longitudinal direction of the blade specimen.

* * * * *